United States Patent [19]

Hanson

[11] Patent Number: 5,286,082
[45] Date of Patent: Feb. 15, 1994

[54] ANATOMICALLY COMPENSATING CYCLE SADDLE

[75] Inventor: Chris A. Hanson, Boulder, Colo.

[73] Assignee: Alden Laboratories, Inc., Boulder, Colo.

[21] Appl. No.: 752,873

[22] Filed: Aug. 30, 1991

[51] Int. Cl.$^5$ .............................................. B62J 1/00
[52] U.S. Cl. ............................... 297/201; 297/195.1; 297/199
[58] Field of Search ............... 297/199, 200, 201, 214, 297/195

[56] References Cited

U.S. PATENT DOCUMENTS

| | | |
|---|---|---|
| 591,330 | 10/1897 | Downes .............................. 297/201 |
| 3,997,214 | 12/1976 | Jacobs . |
| 4,063,775 | 12/1977 | Mesinger . |
| 4,098,537 | 7/1978 | Jacobs . |
| 4,218,090 | 8/1980 | Hoffacker et al. . |
| 4,369,998 | 1/1983 | Blase . |
| 4,387,925 | 6/1983 | Barker et al. . |
| 4,512,608 | 4/1985 | Erani . |
| 4,541,668 | 9/1985 | Rouw . |
| 4,773,705 | 9/1988 | Terranova . |
| 4,877,286 | 10/1989 | Hobson et al. . |
| 5,074,618 | 12/1991 | Ballard .............................. 297/199 |

FOREIGN PATENT DOCUMENTS 554688 6/1932 Fed. Rep. of Germany ...... 297/201

*Primary Examiner*—Laurie K. Cranmer
*Attorney, Agent, or Firm*—Sheridan Ross & McIntosh

[57] ABSTRACT

A cycle saddle which accommodates for the movement of a rider's ischial tuberosities. In one embodiment, portions of the saddle substantially coinciding with the rider's ischial tuberosities yield to the downward movement of the ischial tuberosities to reduce the magnitude of the localized pressure concentrations in these areas. In another embodiment, the saddle has a portion which pivots transversely about the central, longitudinal axis of the saddle during the pedalling motion to account not only for the downward movement of an ischial tuberosity, but also for the associated upward movement of the other ischial tuberosity.

34 Claims, 4 Drawing Sheets

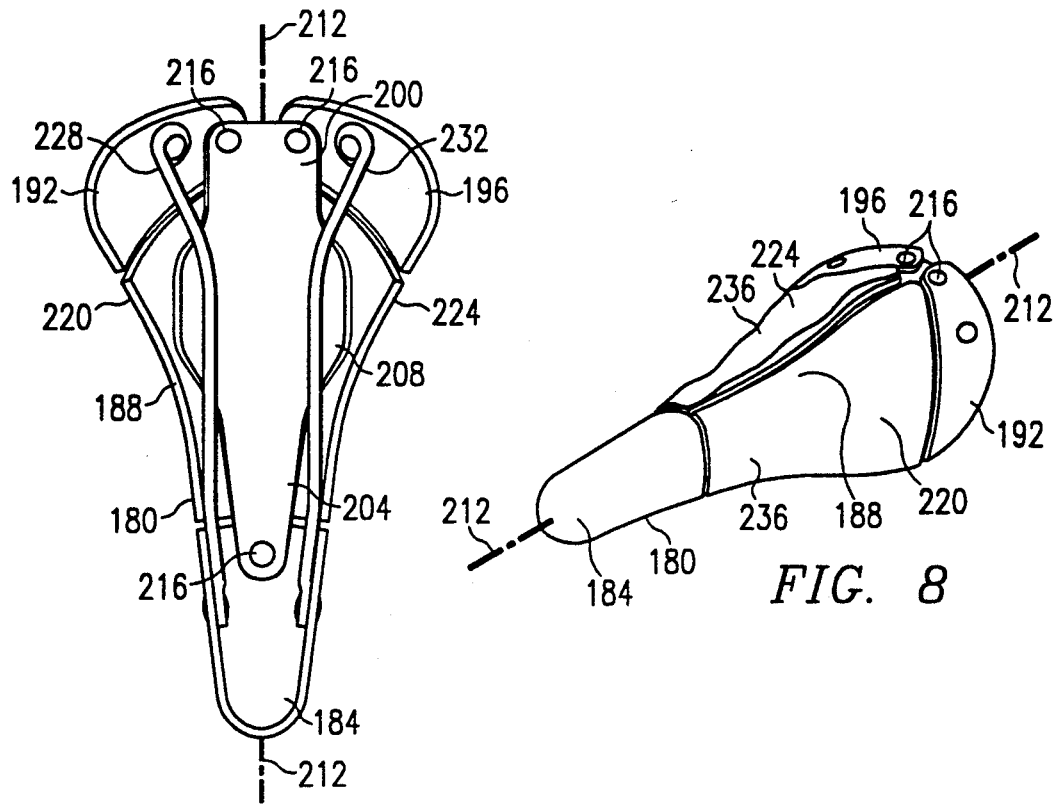
FIG. 8
FIG. 9
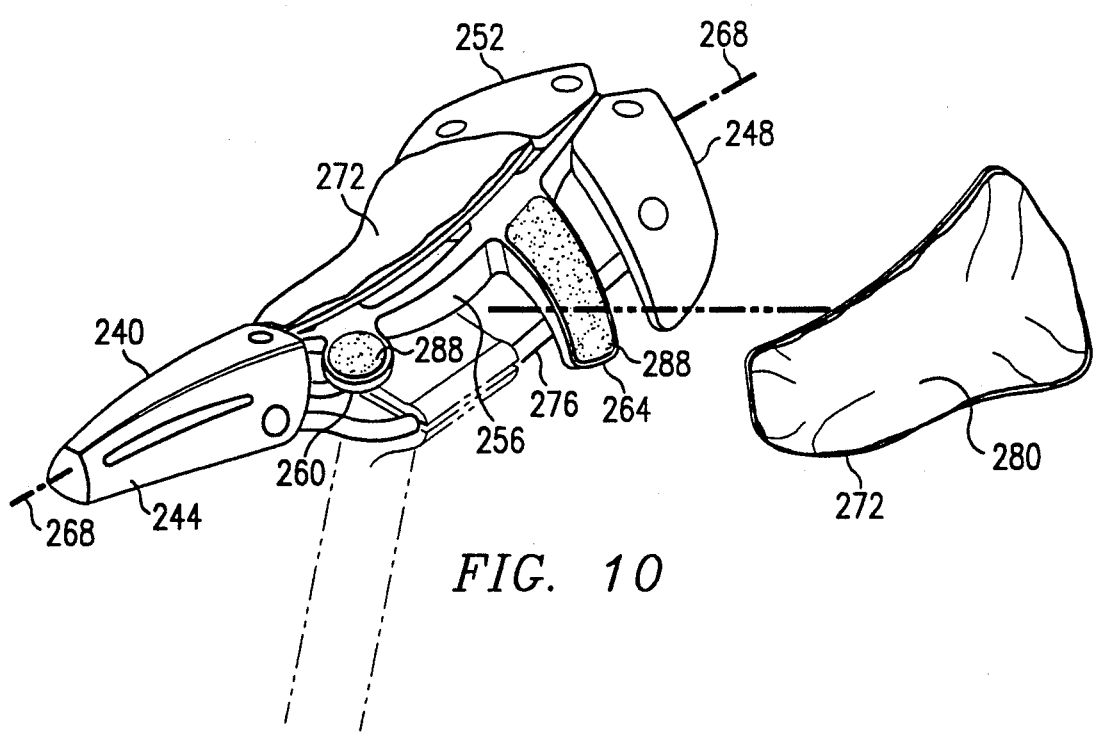
FIG. 10

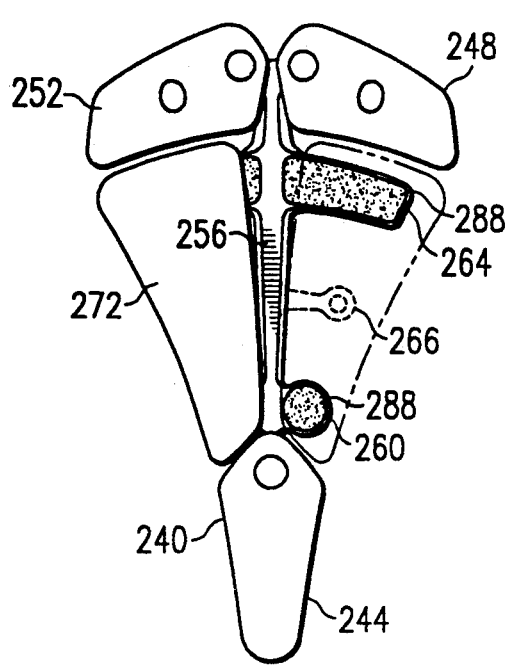
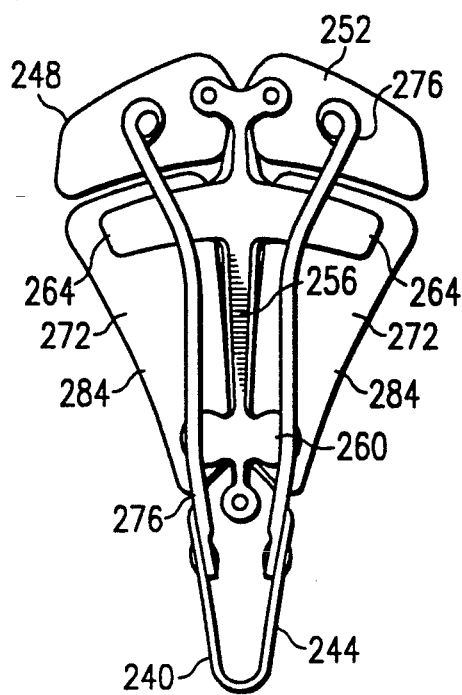
FIG. 11     FIG. 12
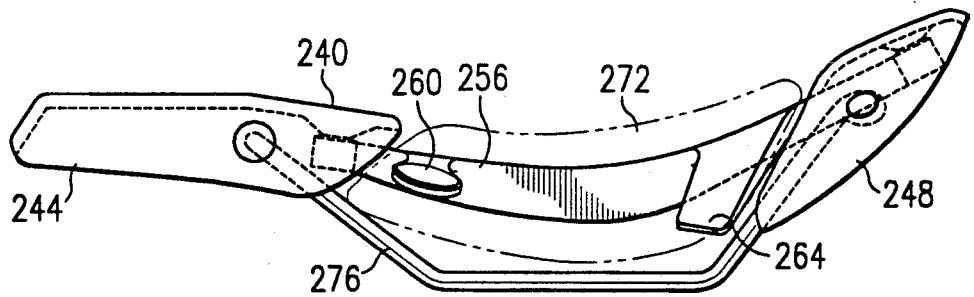
FIG. 13
FIG. 14

ANATOMICALLY COMPENSATING CYCLE SADDLE

FIELD OF THE INVENTION

The present invention generally relates to the field of cycle saddles and, more particularly, to a saddle which compensates for the movement of a rider's ischial tuberosities while pedalling and/or the given anatomical structure of a rider, all to provide a desirable balance between rider comfort and saddle performance.

BACKGROUND OF THE INVENTION

Bicycles have undergone significant design developments and a number of specialized classifications have evolved (e.g., racing, touring, mountain). These classifications typically utilize, for instance, different frame geometries, constructions, and gear ratios, and some even necessitate or accommodate for different rider orientations to optimize performance under a particular set of conditions. Notwithstanding the many variations between the classifications and in fact within the classifications themselves, the saddle remains a primary structure in the interaction between the rider and the bicycle.

The interaction between the rider and the saddle has a significant effect on the comfort accorded the rider and the performance which the rider is able to achieve from the bicycle. When taking rider comfort into consideration in saddle design, the weight of the rider acting upon the saddle should generally be distributed over as large an area as possible to reduce concentrated pressure (i.e., the application of the same magnitude of force over a larger area reduces pressure) In a static analysis, the optimum saddle width would thus be equal to that of the rider's buttocks such that the rider's two ischial tuberosities would each effectively sustain one-half of the rider's weight. However, dynamically this saddle width could adversely affect not only rider comfort, but the level of performance that a rider is able to achieve as well.

An efficient power stroke in pedalling a bicycle requires a substantial downward extension of the legs in an alternating fashion. The amount of this extension is controlled by the distance between the saddle and the lowest pedal position. In the event that a wide conventional saddle is vertically positioned to allow for the desired alternating leg extensions, such extensions will cause the associated ischial tuberosity and/or other adjacently located, protruding bony structures (hereinafter collectively referred to as "ischial tuberosities") to also attempt to move in a downward direction. However, the saddle resists this motion which thereby creates a localized pressure concentration which adversely affects rider comfort.

While pedalling, the ischial tuberosity associated with the leg moving toward the uppermost pedal position tends to move vertically upward and may lose contact with the conventional saddle. In this case, the ischial tuberosity of the downwardly extended leg will effectively support the entire weight of the rider. Consequently, the magnitude of the above-described localized pressure concentration is further increased. In addition to this now magnified level of rider discomfort, performance is also adversely affected in that the saddle inhibits the downward movement of the ischial tuberosity as it attempts to follow the downward extension of the leg in the power stroke.

In order to reduce the effects of the interaction of the ischial tuberosities and the conventional saddle in the above-described manner, the saddle may be positioned such that the desired leg extension is not achieved, i.e., too low. As a result, the amount of downward vertical movement of the ischial tuberosities is reduced which thereby reduces the magnitude of the associated localized pressure concentration. This gain in rider comfort, however, is accompanied by a decrease in the power that the rider is able to generate since the leg can no longer be extended to the desired degree. Moreover, as the amount of leg extension is reduced, undesirable strains and/or stresses may be introduced to the knee joints.

Based on the foregoing problems with the wide conventional saddle, narrower saddles which allow for either free vertical reciprocation of the ischial tuberosities or which allow the ischial tuberosities to contact a downwardly extending, convexly arcuate surface are commonly used by riders. Although this produces a higher performance saddle, the cost in terms of added rider discomfort is significant. Further contributing to these factors is that saddles are typically designed to fit narrow anatomical structures. As a result, larger persons using such saddles often experience an even greater magnitude of discomfort.

Many attempts have been made to design a saddle which provides a more desirable blend of rider comfort and saddle performance. One alternative is to utilize a saddle having a laterally arcuate, convexly-shaped mid portion which is wide enough such that the rider's ischial tuberosities are supported by the saddle, thereby increasing the area over which the rider's weight is applied. Again, in a static analysis this sharing of the load reduces pressure. In order to reduce the effects of the downward movement of the ischial tuberosities in the dynamic analysis, the areas of the saddle which the ischial tuberosities contact are either independently downwardly stretchable (e.g., by utilizing a thinner cross section in this region than is used in remaining portions of the saddle), or there are depressions in these areas of the saddle to engage the ischial tuberosities. U.S. Pat. No. 3,997,214 to Jacobs, issued Dec. 14, 1976; U.S. Pat. No. 4,098,537 to Jacobs, issued Jul. 4, 1978; and U.S. Pat. No. 4,218,090 to Hoffacker et al., issued Aug. 19, 1980, are generally representative of these efforts.

Other saddles have attempted to provide a blend of rider comfort and saddle performance by utilizing a split-seat configuration. For instance, U.S. Pat. No. 4,387,925 to Barker et al., issued Jun. 14, 1983, generally discloses two supports which are each freely (over a limited range of angular motion) and independently pivotable about an axis which is substantially perpendicular to the central, longitudinal axis of the bicycle. The supports are somewhat oblong and contoured to generally conform to the shape of the buttocks and the upper leg portion of the rider. Consequently, the supports effectively pivot to follow the planar motion defined by the legs in pedalling the bicycle.

U.S. Pat. No. 4,541,668 to Rouw, issued Sep. 17, 1985, utilizes a split seat configuration with a substantially similar rotational plane of motion to that of Barker et al. However, the split supports are interconnected such that when the forward portion of one support is deflected downwardly, the forward portion of the opposite support is forced upwardly to the same degree.

A second variation of a split seat configuration accommodates for three-dimensional motion. The individual seat supports are attached to an appropriate supporting structure such that the seat supports deflect according to the manner in which the forces are applied thereto by the rider. Representative of these types of saddles include U.S. Pat. No. 4,063,775 to Mesinger, issued Dec. 20, 1977; U.S. Pat. No. 4,369,998 to Blase, issued Jan. 25, 1983; and U.S. Pat. No. 4,512,608 to Erani, issued Apr. 23, 1985.

Notwithstanding the advancements in cycle saddle design, there remains a need for a saddle which provides for rider comfort without adversely affecting the performance that the rider is able to achieve to a significant degree.

SUMMARY OF THE INVENTION

The present invention is a cycle saddle which accounts for the movement of the rider's ischial tuberosities during the pedalling motion and/or a rider's particular anatomical structure. As a result, the present invention provides a desirable balance between rider comfort and saddle performance.

One embodiment of the present invention generally includes a support structure which is detachably connectable to a cycle. First and second engaging members are positioned on opposite sides of the saddle's central, longitudinal axis and are each connected to and supported by the support structure. Each of these first and second engaging members have a cut which extends along and through a portion of the respective first and second engaging members. Consequently, when an ischial tuberosity exerts a downward force on the saddle in the area defined by one of these cuts, the localized pressure concentrations generated by the downwardly extending ischial tuberosities are reduced.

A number of cut configurations have achieved desirable results in reducing localized pressure concentrations. For instance, each cut may define an arcuate-shaped slit which extends through the structure of the first and second engaging members to define, for instance, a semi-circular tab-like portion. Alternatively, each cut may define a plurality of intersecting slits which extend through the structure of the first and second engaging members to define, for instance, triangularly-shaped, tab-like yielding portions. Furthermore, each cut may define an aperture or hole which extends through the structure of the first and second engaging members.

In some instances it may be desirable to apply forces which resist the downward forces applied to the first and second engaging members by the ischial tuberosities. A resistance control member, such as a leaf spring-type mechanism which has portions for engaging the underside of the first and second engaging members in proximity to the cuts may be positioned under the saddle to apply the desired resisting forces thereto. As can be appreciated, a higher magnitude of resisting forces will enhance rider stability on the saddle, whereas decreasing the resisting forces will enhance rider comfort.

Another embodiment of the present invention generally includes a pivotable member having a first and second end which are each connected to a support structure about the central, longitudinal axis of the saddle. The pivotable member also has first and second portions which are positioned on opposite sides of this axis. When a rider is positioned on the saddle and begins pedalling, the ischial tuberosity associated with the leg which is extending downwardly in the power stroke exerts a downward force on, for instance, the first portion. This causes the pivotable member to pivot transversely about the central, longitudinal axis such that the first portion moves in a downward direction with its associated ischial tuberosity. The second portion, positioned on the side of the saddle coinciding with the leg moving toward the uppermost pedal position, follows the upward movement of its associated ischial tuberosity and attempts to maintain contact therewith. As a result, rider comfort is improved by not only reducing the resistance of the saddle to the downward motion of an ischial tuberosity, but the saddle also attempts to maintain contact with the upwardly moving ischial tuberosity as well such that the load may be shared to a degree by both ischial tuberosities.

A number of features may be incorporated into the above-described embodiment for adjusting the comfort and/or performance of the saddle. With regard to the support structure, it may include a nose which is connected to the first end of the pivotable member for purposes of offering improved stability to the rider when engaging the saddle. Moreover, the support structure may include a rear cantle which is connected to the second end of the pivotable member for purposes of providing a supporting surface for more stationary portions of the buttocks. Since these buttocks portions are typically fleshier, the rear cantle may be positioned at a greater vertical distance relative to the pivotable member to allow for the compression of these fleshier portions which has a stabilizing effect. Moreover, the degree of support of the rear cantle may be adjustable to vary the deflection of the rear cantle at its outer edges when supporting these fleshier portions.

Both a nose and rear cantle may be utilized by the present invention. In this case, the nose and rear cantle may also be interconnected by a rail system. A rail system not only allows for mounting of the saddle on the seat post of a cycle in a conventional manner, but the rail system may also be used to adjust the deflectability of the outer portions of the rear cantle as described above. The support structure may also include a beam for longitudinally supporting the pivotable member, particularly when both the nose and rear cantle are utilized, and/or a beam for laterally supporting the pivotable member. Both beams may be formed from a substantially rigid and T-shaped plate which substantially follows the contour of the saddle or such beams may be independent structures.

The transverse pivotation of the pivotable member about the central, longitudinal axis in the described manner is a comfort enhancing feature since it, for instance, reduces the pressures generated during the interaction of the downwardly moving ischial tuberosities on the saddle during the power stroke. The present invention includes utilizing a substantially free transverse pivotation which provides maximum rider comfort. Moreover, the present invention also includes utilizing a resistance to this transverse pivotation which improves saddle stability and thus performance. This resistance may be adjustable such that the rider may customize the saddle to preferred criteria (i.e., maximum comfort, maximum performance, or various combinations).

Another feature of the present invention which contributes to the improved interaction between the ischial tuberosities and the saddle is the effective profile of the pivotable member. For instance, the pivotable member may utilize a longitudinally concave portion between its first and second ends which desirably approximates the contour of the contacted anatomical structure. This is also a stability enhancing feature since the pivotal axis is then positioned above the lowest concave portion. In order to allow for further rider customization of the saddle, the present invention allows the vertical positioning of the first end of the pivotable member to be adjustable which therefore alters the positioning of this pivotal axis.

Another profile-related feature of the present invention is that the first and second portions of the pivotable member may be defined by substantially planar first and second surfaces, respectively, which extend downwardly and outwardly relative to the central, longitudinal axis of the saddle. This V-shaped profile contributes to enhancing both rider comfort and performance. When an ischial tuberosity contacts, for instance, the first planar surface, the first portion moves downwardly and attempts to pivot downwardly and inwardly away from this ischial tuberosity. Based upon the initial angulation of the first planar surface, this pivoting reduces the effective horizontal cross-sectional area of the first portion to reduce the resistance of the saddle to the power stroke. The second planar surface, on the other hand, is pivoted upwardly and outwardly during this motion of the first planar surface. Based upon the initial angulation of the second planar surface, the upward pivoting of the second portion effectively increases the horizontal cross-sectional area of the second planar surface to provide a larger supporting surface. Consequently, rider comfort is enhanced by not only providing this additional supporting area and having a portion of the saddle effectively move away from the downwardly moving ischial tuberosity, but performance is improved as well since the saddle of the present invention also attempts to pivot away from the downwardly extending ischial tuberosity during the power stroke.

Saddle width also has an impact upon rider comfort and performance. Since the dimensions of the anatomical structures of riders varies significantly, the present invention also provides a width adjustment feature. For instance, in the above-described embodiment which utilizes transverse pivotation, the first and second portions of the pivotable member may be detachably connected to the support structure such that the distance which such first and second portions extend away from the central, longitudinal axis of the saddle may be independently adjusted. This adjustment may of course be such that the first and second portions have an edge which is substantially parallel to a longitudinal axis (an equal width adjustment), or the first and second portions may be skewed relative to the central longitudinal axis (e.g., so that a rear portion of the first portion may be positioned outwardly a greater distance than its forward portion). Notwithstanding the description of this width adjustment feature in relation to the pivotable member of the above-described embodiment, this saddle width adjustment embodiment of course may be incorporated into a variety of saddle designs since adjusting the saddle to conform to the anatomical structure of the rider will in and of itself enhance rider comfort and performance.

BRIEF DESCRIPTION OF THE DRAWINGS

FIG. 8 is a perspective view of one embodiment of a sectionalized cycle saddle of the present invention which accounts for movement of both ischial tuberosities;

FIG. 9 is a bottom view of the saddle or FIG. 8;

FIG. 10 is a perspective view of one embodiment of a modular cycle saddle of the present invention which accounts for movement of both ischial tuberosities;

FIG. 11 is a top view of the saddle of FIG. 10;

FIG. 12 is a bottom view of the saddle of FIG. 10;

FIG. 13 is a side view of the saddle of FIG. 10; and

FIG. 14 is side view of a flow pack for detachable connection to the saddle of FIG. 10.

DETAILED DESCRIPTION

The present invention will be described with reference to the accompanying drawings which assist in illustrating the pertinent features thereof. Generally, the present invention is a cycle saddle which accounts for the anatomical interaction between the rider and the saddle in a manner which provides for a desirable balance between rider comfort and saddle performance. For instance, one embodiment of the present invention is reactive to the downward forces exerted on the saddle by a rider's ischial tuberosities to reduce localized pressure concentrations in the contacted area. Another embodiment is directed toward accommodating for the motion of both ischial tuberosities to, for instance, improve upon the amount of the load (i.e., the rider's weight) which is shared between the rider's ischial tuberosities during the pedalling cycle. A further embodiment accounts for the described anatomical interaction by providing a manner to adjust portions of the saddle to better conform to the anatomical structure of a given rider. The particular features of the present invention which provide for these and numerous other advantages are discussed below.

One embodiment of the present invention is generally directed toward reducing the magnitude of localized pressure concentrations generated when an ischial tuberosity interacts with a saddle. In the event a rider utilizes a saddle in which the ischial tuberosities engage an unyielding supporting surface, the rider's weight will be effectively equally distributed on the two ischial tuberosities if there is no subsequent downward motion of such ischial tuberosities. This may be achieved to a degree by positioning the saddle relative to the pedals such that there is only limited extension of the legs in the power stroke portion of the pedalling cycle. However, this is undesirable since not only does it reduce the ability for the rider to generate power, but it also introduces undesirable stresses on, for instance, the knee joints. Alternatively, this substantially equal distribution between the ischial tuberosities may be achieved in a static condition when the rider is merely sitting on the saddle. However, the pedalling cycle is dynamic and if the saddle is positioned at a sufficient vertical distance to allow for an effective power stroke, there will be downward movement of the ischial tuberosities into the saddle which will generate increased localized pressure concentrations in these regions.

During the extension of the leg in the power stroke, the associated ischial tuberosity has a tendency to move in a downward direction. However, the opposite ischial tuberosity associated with the leg moving toward an uppermost position has a tendency to move in an upward direction and it may even lose contact with the saddle. In this case, the downwardly extending ischial tuberosity will support a disproportionate share of the load to further magnify the described localized pressure concentration.

Figure 1:
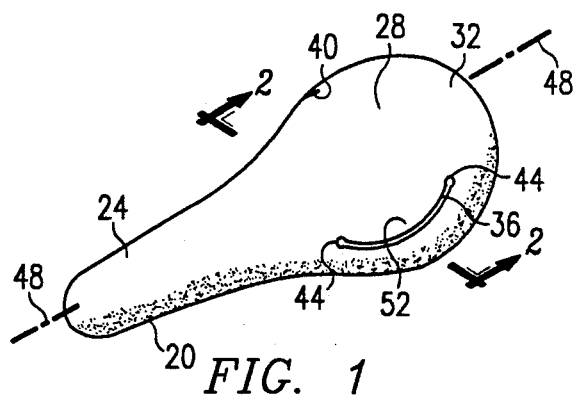
FIG. 1 is a perspective view of one embodiment of a cycle saddle of the present invention which accounts for downward move of the ischial tuberosities.
Figure 2:
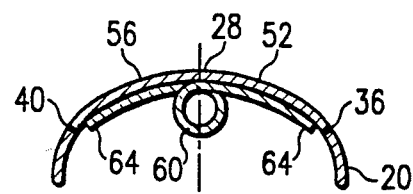
FIG. 2 is cross-sectional view of the saddle of FIG. 1 taken along line 2—2.

One embodiment of the present invention is illustrated in FIGS. 1-2. The saddle 20 utilizes a shell-type construction (FIG. 2). Although a variety of materials and processes can be utilized to form the shell structure, typically such saddles are polymer-based and formed in an injection molding process and thus have an inherent degree of flexibility. The saddle 20 is somewhat conventional in that it utilizes a nose 24, mid section 28, and rear cantle 32. The nose 24 is available for stabilizing the rider on the saddle 20 and the rear cantle 32 is available for supporting the fleshier portions of the rider's buttocks as in the case of a standard shell-type saddle. The mid section 28, however, is the typical area in which the rider's ischial tuberosities contact the saddle 20. Therefore, in order to account for the described downward movement of the ischial tuberosities during the pedalling motion and for a given range of ischial spacings (i.e., the width of a rider's ischial tuberosities), unlike a standard shell-type saddle the saddle 20 incorporates first and second arcuate slits 36, 40 which extend completely through its shell structure on opposite sides of the saddle 20 as best illustrated in FIG. 2.

A first arcuate slit 36 is positioned on one side of the central, longitudinal axis 48 of the saddle 20 and it extends downwardly and away from this axis 48. Holes 44 are positioned at the ends of the first arcuate slit 36 to reduce stress concentrations in the shell structure. Consequently, a first engaging surface 52 is thereby defined between the first arcuate slit 36 and the axis 48. The second arcuate slit 40 is positioned on the opposite side of the axis 48 and is the mirror image of the first arcuate slit 36 to thereby define a second engaging surface 56.

A rider's ischial tuberosities, if the ischial spacings are within a given range, will contact the first and second engaging surfaces 52, 56. When the rider initially sits on the saddle 20, the first and second arcuate slits 36, 40 allow the first and second engaging surfaces 52, 56, respectively, to downwardly deflect and actually separate from remaining portions of the saddle 20 along lines defined by the slits 36, 40. Due to this effective "give" of the saddle 20 in these relatively limited areas, the magnitude of the localized pressure concentration generated in the contact between the ischial tuberosities and the saddle 20 is reduced. As the legs extend downwardly during their respective power strokes, the associated first and second engaging surfaces 52, 56 will further downwardly deflect due to the forces transferred thereto by the associated ischial tuberosity. As a result, the localized pressure concentrations generated during the dynamic downward movement of the ischial tuberosities are also reduced by the yielding separation of the saddle 2 in these defined and limited regions.

As can be appreciated, the positioning of the first and second arcuate slits 36, 40 at a certain distance from the axis 48 will allow the saddle 20 to be used by rider's which have ischial spacings which fall within a given range. More particularly, the saddle 20 may be used by riders having an ischial spacing which is such that the ischial tuberosities will contact the first and second engaging surfaces 52, 56. In order to accommodate for use of the saddle 20 by riders having an ischial spacing outside of this range, the distance which the first and second arcuate slits 36, 40 are positioned from the axis 48 must be changed to effectively vary the area of the first and second engaging surfaces 52, 56 (i.e., for a range of wider rider ischial spacings, the first and second arcuate slits 36, 40 must each be positioned at a greater distance from the axis 48 to enlarge the first and second engaging surfaces 52, 56).

In enhancing rider comfort, the saddle 20 does so without adversely affecting performance to a significant degree. For instance, the nose 24 and rear cantle 32 remain relatively stable. Moreover, the portion of the mid section 28 overlying the axis 48 also remains relatively stable. Consequently, the motion of the saddle 20 is effectively limited to those regions which coincide with the ischial tuberosities so as to not adversely affect the performance which the rider is able to achieve from the saddle 20.

The amount of flexure of the first and second engaging surfaces 52, 56 is determined by a variety of factors, such as by the effective longitudinal length of the first and second slits 36, 40 and/or the degree of their arcuateness. Moreover, as illustrated in FIG. 2, a spring mechanism 60 may be positioned under the saddle 20 to exert upward forces on the first and second engaging surfaces 52, 56 and/or to provide a resisting force to downward movement of the first and second engaging surfaces 52, 56. The spring mechanism 60 may be attached to the supporting structure of the saddle 20 in a variety of ways, such as by positioning the spring mechanism 60 on an extension of the rails (not shown) which are commonly used to connect the saddle to a seat post of a cycle.

The spring mechanism 60 has legs 64 which extend outwardly from the central portion of the spring mechanism 60. Each leg 64 effectively acts as a leaf spring with regard to the first and second engaging surfaces 52, 56 to provide the desired resistance. As can be appreciated, the degree of resistance offered by the spring mechanism 60 may be modified in various manners, including replacement, and other types of resistance providing structures may be used as well.

Figure 3:
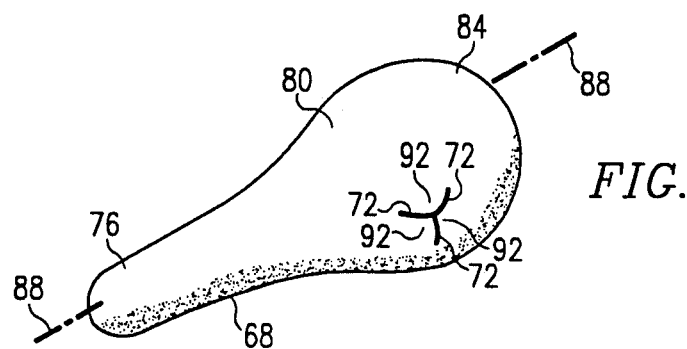
FIG. 3 is a perspective view of one embodiment of a cycle saddle of the present invention which accounts for downward movement of the ischial tuberosities.

Another embodiment of the present invention is illustrated in FIG. 3. The saddle 68 is substantially similar to the saddle 20 of FIGS. 1-2 and thus includes a nose 76, mid section 80, and rear cantle 84 and is also of a shell-type construction. However, instead of utilizing the first and second arcuate slits 36, 40, the saddle 68 utilizes a plurality of intersecting slits 72 which extend completely through the shell of the saddle 68 in portions of its mid section 80. The embodiment illustrated in FIG. 3 positions three of such intersecting slits 72 on each side of the central, longitudinal axis 88 of the saddle 68 (only one side shown) which intersect at a point substantially coinciding with the location of a rider's ischial tuberosities. These intersecting slits 72 thereby define three substantially triangularly-shaped yielding portions 92. Consequently, when the rider's ischial tuberosities engage a region near the intersection of the slits 72, one or more of the triangular yielding portions 92 will separate from remaining portions of the mid section 80 along lines defined by the intersecting slits 72. This yielding separation of the saddle 68 therefore accounts for the downward movement of the ischial tuberosities which thereby enhances rider comfort by reducing the magnitude of the localized pressure concentration.

As in the case of the saddle 20, the remaining portions of the saddle 68 remain relatively stable so as to not adversely affect performance. Moreover, although three intersecting slits 72 have been illustrated, only a plurality of such slits 72 are required by this embodiment. In addition, the length and/or number of intersecting slits 72 may be varied to modify the degree of yielding separation which the saddle 68 offers. Furthermore, some type of resistance providing mechanism similar to the spring mechanism 60 described above may be incorporated. In addition, the positioning of the slits 72 will again accommodate for a certain range of ischial spacings. However, this range may be varied by changing the distance from the axis 88 where the slits 72 intersect on each side of the saddle 68.

Figure 4:
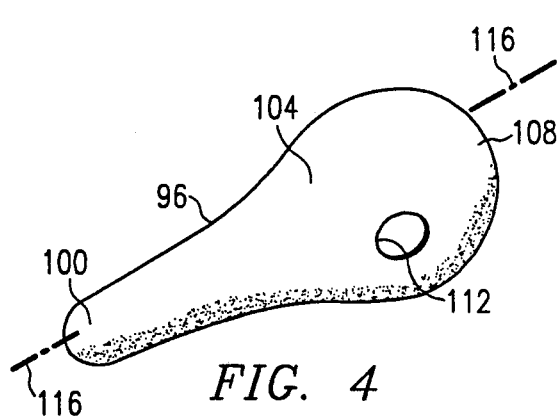
FIG. 4 is a perspective view of one embodiment of a cycle saddle of the present invention which accounts for downward movement of the ischial tuberosities.

Another embodiment of the present invention is illustrated in FIG. 4. The saddle 96 is similar to saddles 20 and 68 described above and thus includes a nose 100, mid section 104, and rear cantle 108 and is of a shell-type construction. However, instead of utilizing first and second arcuate slits 36, 40 or intersecting slits 72, the saddle 96 incorporates two receiving cavities 112 which extend completely through the shell structure of the saddle 96. More particularly, a receiving cavity 112 is positioned on the mid section 104 on both sides of the central, longitudinal axis 116 (only one side shown) to substantially coincide with the rider's ischial tuberosities. The rider's ischial tuberosities are thus able to enter the receiving cavities 112 during the pedalling motion and little or no resistance is provided by the saddle 96 to their downward motions. Therefore, rider comfort is enhanced and the rider's weight is then supported by the fleshier regions of the buttocks surrounding the ischial tuberosities versus the ischial tuberosities themselves. Notwithstanding this increase in rider comfort, remaining portions of the saddle 96 remain relatively stable so as to not adversely affect performance to a significant degree.

As was the case with saddles 20 and 68, the saddle 96, with a given positioning of the cavities 112 from the axis 116, will be most effective for a given range of rider ischial spacings. However, by varying the distance of the cavities 112 from the axis 116, the range of ischial spacings may be changed to accommodate for use of the saddle 96 by riders having an ischial spacing within such range.

The shell-type structure saddles 20, 68, and 96 described above improve upon rider comfort by reducing resistance to the downward movement of the rider's ischial tuberosities through the yielding separation of portions of such saddles in limited areas which coincide with the ischial tuberosities. In order to further improve upon rider comfort, each of the saddles 20, 68, and 96 may also incorporate a padding material (not shown).

Allowing for isolated movement of a cycle saddle in the area of a downwardly moving ischial tuberosity enhances rider comfort by reducing saddle resistance forces which in turn reduces the magnitude of the localized pressure concentration. However, as described above, in conjunction with the downward movement of one ischial tuberosity is the upward movement of the second ischial tuberosity. In those instances where this upwardly moving ischial tuberosity loses contact with a given saddle, all of the load is effectively carried by the downwardly extending ischial tuberosity, or possibly portions of the buttocks in proximity to the ischial tuberosity in the case of the above-described embodiments. Therefore, notwithstanding the significant improvements the above embodiments have in reducing localized pressure concentrations, such concentrations can be further reduced by attempting to maintain a sharing of the load between both ischial tuberosities during the pedalling motion.

Figure 5:
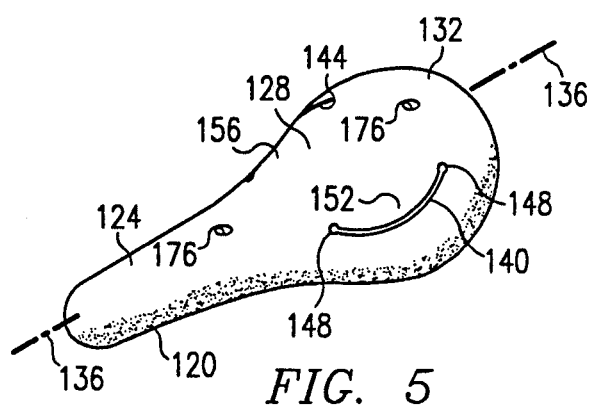
FIG. 5 is a perspective view of one embodiment of a cycle saddle of the present invention which accounts for movement of both ischial tuberosities.
Figure 6:
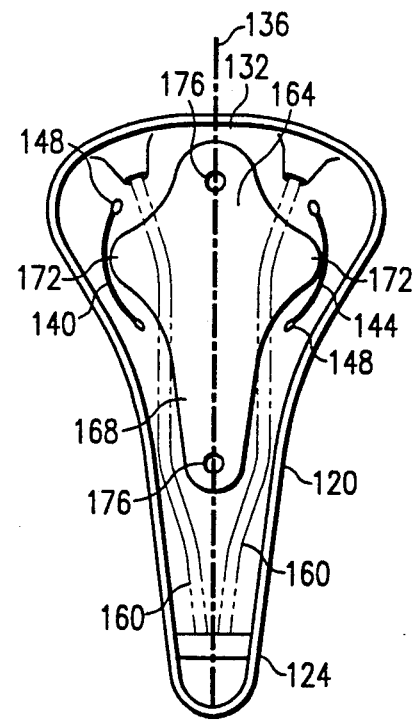
FIG. 6 is a bottom view of the saddle of FIG. 5.

One embodiment of the present invention which provides the above-described combinative features is illustrated in FIGS. 5-6. The saddle 120 is of a shell-type construction and thus has a profile similar to that of the saddle 20 as illustrated in FIG. 2. Moreover, the saddle 120 is somewhat conventional in that it includes a nose 124 and a rear cantle 132 which perform similar functions to those corresponding portions of the saddle 20. In addition, rails 160 are also provided for attaching the saddle 120 to a seat post in a conventional manner. However, unlike a conventional shell-type saddle, the saddle 120 utilizes a pivotable member 128 positioned between the nose 124 and the rear cantle 132. This pivotable member 128 pivots transversely about the central, longitudinal axis 136 of the saddle 120 to account for the movement of both ischial tuberosities during the pedalling motion to further improve rider comfort in the above-described manner.

The pivotable member 128 is defined by first and second arcuate slits 140, 144 which are positioned on opposite sides of the central, longitudinal axis 136 of the saddle 120. These arcuate slits 140, 144 each extend downwardly and away from the axis 136 to define first and second engaging surfaces 152, 156, respectively, which interact with the ischial tuberosities. Moreover, holes 148 are again utilized at the ends of the slits 140, 144 to reduce the stress concentrations in the shell of the saddle 120. Consequently, the saddle 120 is similar to the saddle 20 described above, the difference being effectively one of degree.

As can be appreciated, the distance between the corresponding ends of the first and second arcuate slits 140, 144 will affect whether the pivotable member 128 pivots in the described manner or whether the first and second engaging surfaces 152, 156 independently deflect similar to the first and second engaging surfaces 52, 56 of the saddle 20. As the corresponding ends of the first and second arcuate slits 140, 144 are spaced further apart, there will be less pivotation of the pivotable member 128 in a uniform manner (i.e., the first or second engaging surface 152, 156 associated with the downwardly extending ischial tuberosity may deflect downwardly more than the degree of upward movement of the first or second engaging surface 152, 156 associated with the upwardly moving ischial tuberosity). On the other hand, as the corresponding ends of the first and second arcuate slits 140, 144 are more closely positioned, a more uniform pivotation of the pivotable member 128 will be achieved. Consequently, absent the use of the beam structure described below, there is not a defined point at which uniform pivotation of the pivotable member 128 is achieved versus totally independent deflection of the first and second engaging surfaces 152, 156. As can be appreciated, the positioning of the first and second arcuate slits 140, 144 relative to each other will again define the range of rider ischial spacings for which the saddle 120 will effectively perform.

In order to enhance the uniformity of the transverse pivotation of the pivotable member 128 to move toward a sharing of the rider's weight by both ischial tuberosities, the saddle 120 includes a beam structure 164 which is positioned about the central, longitudinal axis 136. More particularly, the beam structure 164 is positioned under the saddle 120 and is attached thereto by rivets 176 which extend through the beam structure 164 and the shell of the saddle 120. Although these rivets 176 are illustrated as being on the axis 136, it can be appreciated that as long as the beam structure 164 is attached to the saddle 120 about the axis 136, the desired transverse pivotation of the pivotable member 128 can be achieved.

As the corresponding ends of the first and second arcuate slits 140, 144 are moved closer together, there may be a need to add longitudinal support to the saddle 120. Consequently the beam structure 164 includes a longitudinal section 168 which may be contoured to follow the profile of the saddle 120 (not shown). In order to support the first and second engaging surfaces 152, 156, as well as to improve the uniformity of pivotation of the pivotable member 128, the beam structure 164 also includes a lateral section 172 which extends across a lateral portion of the first and second engaging surfaces 152, 156. This lateral section 172 may also be used to control the initial deflectablity of the first and second engaging surfaces 152, 156 when a rider sits upon the saddle 120 and/or the initial orientation of the first and second engaging surfaces 152, 156 relative to remaining portions of the saddle 120. As can be appreciated, the longitudinal and lateral sections 168, 172 can be individual components or they may be formed in integral structure. Moreover, the beam structure 164 can be formed to follow the contour of the saddle 120.

Figure 7A:
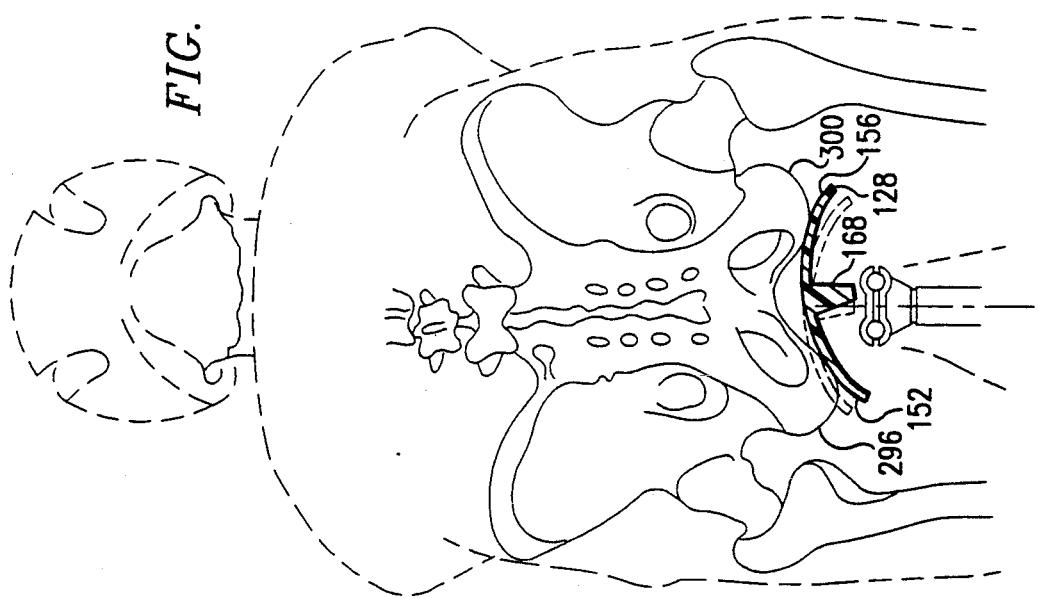
FIG. 7a is a cross-sectional view of one embodiment of a cycle saddle of the present invention, illustrating the positioning of the central portion of the saddle during the power stroke of a first leg.
Figure 7B:
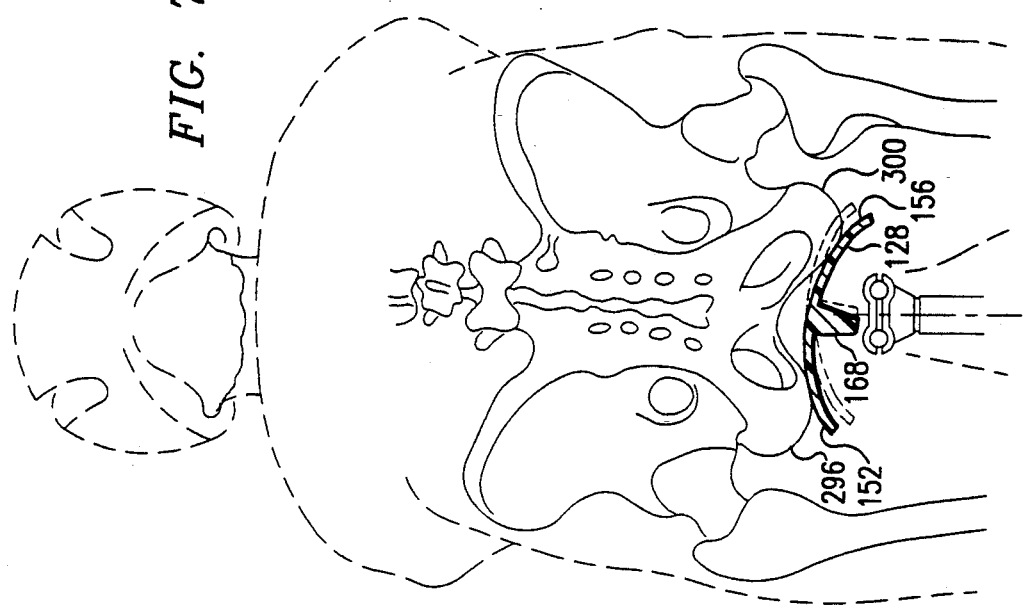
FIG. 7b is a cross-sectional view of one embodiment of a cycle saddle of the present invention, illustrating the positioning of the central portion of the saddle during the power stroke of a second leg.

Based upon the foregoing, it can be appreciated that the saddle 120, with or without the beam structure 164, improves upon rider comfort by allowing the pivotable member 128 to pivot transversely about the central, longitudinal axis 136 to better approximate the movement of both ischial tuberosities. FIGS. 7a and 7b illustrate this motion of the ischial tuberosities and the reaction of the saddle 120 to this motion. For purposes of clarification, only the pivotable member 128 portion of the saddle 120 has been illustrated and the longitudinal section 168 has been extended in a downward direction to provide a further indication of the degree of the angular motion.

Referring to FIG. 7a, as the first ischial tuberosity 296 of a downwardly extending leg exerts a force on the first engaging surface 152 of the pivotable member 128, the first engaging surface 152 deflects downwardly to reduce the magnitude of the localized pressure concentration due to this engagement. The amount of this downward movement via the transverse pivotation of the pivotable member 12 is illustrated by the dashed lines of the pivotable member 128 which is the static position of the pivotable member 128. In conjunction with the downward movement of one side of the pivotable member 128 is the upward movement of the second engaging surface 156 to follow the motion of the second ischial tuberosity 300 associated with the upwardly moving leg, as also illustrated in FIG. 7a. As the power stroke alternates to the other leg as illustrated in FIG. 7b, the movement of the first and second supporting surfaces 152, 156 is reversed by the transverse pivotation of the pivotable member 128 about the axis 136 of the saddle 120 in the opposite direction. Consequently, not only does the saddle 120 provide for the downward flexure which reduces the magnitude of the localized pressure concentration created by a downwardly extending ischial tuberosity, but it follows the upward motion of the opposite ischial tuberosity in an attempt to share the rider's weight to a degree between both ischial tuberosities.

As can be appreciated, a freely pivoting connection of the pivotable member 128 will provide maximum comfort to the rider. However, this free pivotation will also decrease the stability of the saddle 120. Therefore, it is desirable for the saddle 120 to provide some resistance to the pivotation of the pivotable member 128. This can be achieved in a variety of ways. For instance, one alternative is to increase the distance from the axis 136 where the beam structure 164 is attached to the saddle 120. Moreover, the material selection of the beam structure 164 may be altered to modify this resistance. In addition, the spring mechanism 60 described above with regard to saddle 20 may be utilized to provide a variable resistance (not shown).

Another embodiment of the present invention is illustrated in FIGS. 8-9. The saddle 180 is sectionized and has a shell-type structure. Consequently, the saddle 180 utilizes a separate nose 184, pivotable member 188, and first and second rear cantles 192, 196, all of which are interconnected by a beam structure 200 configured to follow the contour of the saddle 180. The beam structure 200 has a longitudinal section 204 which is attached to the nose 184 on the central longitudinal axis 212 and which is attached to each of the first and second rear cantles 192, 196 about the axis 212. The beam structure 200 can be attached to the saddle 180 at the described locations by a variety of methods, one of which is by rivets 216 which extend through the shell of the saddle 180 and the beam structure 200. First and second rails 228, 232 also interconnect the nose 184 and the first and second rear cantles 192, 196, respectively. These rails 228, 232 again are used to attach the saddle 180 to a seat post in a conventional manner.

The beam structure 200 not only serves to interconnect and support the described sectional portions of the saddle 180, but it also functions to improve upon the uniformity of the transverse pivotation of the pivotable member 188 about the axis 212 in a manner similar to that described above with regard to pivotable member 128 of saddle 120. In this regard, the pivotable member 188 includes first and second engaging surfaces 220, 224 which are positioned on opposite sides of the axis 212. A lateral section 208 of the beam structure 200 is positioned underneath these engaging surfaces 220, 224. Consequently, when the first engaging surface 220 is forced in a downward direction, the second engaging surface 224 is forced in an upward direction to substantially the same degree. Again, these alternating upward and downward movements of the first and second engaging surfaces 220, 224 are caused by the pivotation of the pivotable member 188 transversely about the central, longitudinal axis 212 of the saddle 180. The advantages of this type of movement are similar to those associated with the saddle 120 discussed above and this general motion is representatively illustrated in FIGS. 7a and 7b.

The first and second rear cantles 192, 196 are also connected to the nose 184 by first and second rails 228, 232, respectively. These rails 228, 232 allow for conventional attachment of the saddle 180 to a seat post as discussed above. However, the rails 228, 232 can also be used to adjust the deflectability of the first and second rear cantles 192, 196, respectively, by varying the distance from the axis 212 where the first and second rails 228, 232 are attached to the first and second rear cantles 192, 196, respectively. The sectionalized nature of the saddle 180 also allows this deflectability to be changed by varying material and/or structural characteristics of the first and second rear cantles 192, 196. For instance, a thicker cross-section for a given rear cantle 192, 196 will increase resistance to flexure, as will utilizing a stiffer material for the cantles 192, 196.

The sectional nature of the saddle 180 provides further advantages. For instance, the nose 184 may be pivotally connected to the rails 228, 232 such that the nose 184 may be pivoted to and then fixed (not shown) in various angular positions. This is advantageous in that the rider may adjust the nose 184 upwardly or downwardly as preferred for comfort and/or performance. Moreover, it can be appreciated that this pivoting, with the saddle 180 being fixed to the cycle by the engagement of the rails 228, 232 with a seat post clamp (not shown), will also alter the orientation of the pivotal axis of the pivotable member 188. Consequently, this will affect the manner in which the pivotable member 188 transversely pivots about the axis 212 of the saddle 180.

As can be appreciated the saddle 180 may incorporate padding materials for the nose 184, pivotable member 188, and/or the first and second rear cantles 192, 196. Since the nose 184 and rear cantles 192, 196 remain relatively stable during use of the saddle 180 and have a tendency to be the shock absorbing portions of the saddle 180, it may be desirable to utilize conventional foam padding in these areas based upon its shock absorbing characteristics. However, on the pivotable member 188 it may be desirable to utilize a viscous, flowable material contained within a pliable enclosure since these flowable materials will conform to the individual anatomical structures of a rider to equalize pressure in the contacted areas. Consequently, the saddle 180 includes two flow packs 236, each of which contain the described flowable material, which are positioned on both sides of the axis 212, namely the first and second engaging surfaces 220, 224. These flow packs 236 may be attached to the pivotable member 188 in a variety of manners. However, it may be desirable to utilize a detachable connection (not shown) such that a rider can change flow packs 236 and thus the viscosity of the flowable material as preferred.

Another embodiment of the present invention is illustrated in FIGS. 10-13. The saddle 240 utilizes a modular design to advantageously allow for rider customization of the saddle 240. In this regard, the saddle 240 generally includes a nose 244 which is connected to a first and second rear cantle 248, 252 by a longitudinal beam 256 which is positioned along the of first and second lateral beams 260, 264 extend outwardly and downwardly from the longitudinal beam 256 in a position between the nose 244 and the first and second rear cantles 248, 252. Each first and second lateral beam 260, 264 on a given side of the axis 268 is thus able to support a flow pack 272. These flow packs 272 contain the above described flowable material and have a stiffener plate 284 on the back portion thereof (FIG. 14) such that the flow packs 272 may be detachably connectable to the first and second lateral beams 260, 264. Rails 276 are also provided to facilitate attachment of the saddle 240 to a cycle by conventional methods.

When a flow pack 272 is appropriately attached to a first and second lateral beam 260, 264 on each side of the central, longitudinal axis 268, the ischial tuberosity of the downwardly extending leg will contact one of the flow packs 272 and cause its supporting first and second lateral beams 260, 264, as well as the longitudinal beam 256, to transversely pivot effectively about the axis 268. In conjunction with this downward movement of the saddle 240 due to this transverse pivotation, the oppositely positioned flow pack 272 and its associated supporting first and second lateral beams 260, 264 pivot upwardly to follow the upwardly extending ischial tuberosity to attempt to maintain contact therewith. This general transverse pivotation of the central portion of the saddle 240 is thus similar to that utilized by saddles 120 and 180 discussed above and thus the illustrations of FIGS. 7a and 7b representatively apply to saddle 240 as well. However, the saddle 240 utilizes additional features which improves upon this pivotation to further improve rider comfort.

The longitudinal beam 256 is concavely contoured between the nose 244 and the first and second rear cantles 248, 252, as best illustrated in FIGS. 10 and 13, to approximate a rider's anatomical structure which improves rider comfort. However, this concaveness also positions the locations where the longitudinal beam 256 is attached to the nose 244 the first and second rear cantles 248, 252 at a greater vertical distance than the lowest portion of the longitudinal beam 256. Having the pivotal axis of the longitudinal beam 256 be above its central portion not only improves the stability of the saddle 240, but it also introduces a movement of this portion of the saddle 240 which promotes improved rider comfort.

The flow pack 272 of the saddle 240 which is pivoted downwardly by a downwardly extending ischial tuberosity will actually cause the saddle 240 to not only transversely pivot about the central, longitudinal axis 268 as described above, but based upon the positioning of the pivotal axis of the longitudinal beam 256, the mid portion of the saddle 240 will actually move laterally away from the source of this downward force. This furthers the reduction of the localized pressure concentration generated by a downwardly extending ischial tuberosity. As in the case of the saddle 180, the nose 244 of the saddle 240 may be pivoted and fixed into various angular orientations in accordance with rider preference and to alter the orientation of this pivotal axis which may change this lateral movement.

The above-described lateral movement is one additional feature of the saddle 240 which adds to rider comfort. There are, however, additional such features. For instance, the first and second lateral beams 260, 264 extend downward and away from the longitudinal beam 256 such that when flow packs 272 are positioned thereon, two downwardly extending planes are effectively defined. More particularly, the flow packs 272 have a somewhat V-shaped configuration in their respective mid portions, as illustrated in FIG. 14, which provides further rider comfort in the dynamic state.

When an ischial tuberosity contacts one of the downwardly extending planes defined by the mid portions of flow packs 272, which causes the described transverse pivotation about the axis 268, the angle of the associated plane relative to a fixed horizontal plane increases. As a result, the horizontal surface area for supporting the rider on this side of the saddle 240 is reduced which allows for reduced restriction of the downward movement of the ischial tuberosity. In conjunction with this loss of supporting area on the one side of the saddle 240, however, is an increase in the supporting area on its other side. More particularly, the angle between the other side of the saddle 240, as defined by this mid portion of the flow pack 272, and the defined horizontal plane decreases. As a result, there is an increase in the horizontal supporting area for the other side of the rider's anatomy. Therefore, the saddle 240 reduces the horizontal support in the downwardly extending side of the rider to reduce resistance and increases the horizontal support on the upwardly extending side of the rider.

The modular nature of the saddle 240 also allows for the resistance to the described transverse pivotation to be modified. For instance, a third lateral beam 266 may be added which extends downwardly and outwardly from the longitudinal beam 256. Beam 266 could be useful to provide a vertical stop, such that longitudinal curvature of the stiffener plate 284 (FIG. 14) can be adjusted. Moreover, the material selections of the longitudinal beam 256 may be changed and/or its physical dimensions. Furthermore, the attachment of the beam 256 to the rear cantles 248, 252 and/or the nose 244 may be varied (i.e., the distance from the axis 268 where the beam 256 attaches may be varied).

The above-described movements of the saddle 240 contributes to rider comfort. However, the saddle 240 also provides for rider customization. The flow packs 272 are detachably connected to the first and second lateral beams 260, 264 on both sides of the saddle 240. Referring to FIG. 13, the flow pack 272 is formed by joining a pliable material 280 to a stiffener plate 284. The stiffener plate 284 has a slight curvature between its two ends. Moreover, the pliable material 280 is attached thereto such that the ends of the flow pack 272 are thicker than its mid portion. As a result, when the flow pack 272 is attached to and extending between a first and second lateral beam 260, 264, the mid portion of the flow pack 272 will be at a greater angle relative to a horizontal plane compared to the forward and rearward portions of the flow pack 272 which provides the above-discussed advantages.

The flow packs 272 are detachably connectable to the first and second lateral beams 260, 264. One alternative for establishing this detachable connection is to position velcro fasteners 288 on the first and second lateral beams 260, 264 and on the backs of the stiffener plates 284 of the flow packs 272 at 292. Consequently, either flow pack 272 be positioned in different orientations on the associated first and second lateral beams 260, 264 in accordance with the preference of the rider. For instance, the flow packs 272 may be positioned at varying distances from the longitudinal beam 256 to accommodate for the various widths between the ischial tuberosities of various riders. However, the flow packs 272 need not necessarily be positioned parallel to the longitudinal beam 256 (i.e., the forward portion of a flow pack 272 may be closer to the beam 256 than the rearward portion of such flow pack 272). Moreover, the flow packs 272 can be adjusted independently of each other. As can be appreciated, this width adjustment feature in and of itself is a comfort enhancing feature. Therefore, this width adjustment feature may be incorporated on a saddle which does not utilize the transverse pivotation used by saddle 240 (i.e., a substantially stationary saddle).

The rear cantles 248, 252 of the saddle 240 also offer a customization feature. For instance, the rear cantles 248, 252 may be readily replaced to alter their deflectability. For instance, material selection and/or cross sectional thickness may be modified to provide for a rider's desired objectives. Moreover, the point at which the rails 276 attach to the rear cantles 248, 252 may be modified (i.e., a rail 276 may be positioned at various distances from the longitudinal beam 256).

Based upon the foregoing, it is apparent that saddle 240 may be customized in accordance with the preferences of the rider. Changes can be made to customize the saddle 240 to the anatomical structure of the rider, and/or to modify the comfort and performance offered by the saddle 240.

The foregoing description of the invention has been presented for purposes of illustration and description. Further, the description is not intended to limit the invention to the form disclosed herein. Consequently, variations and modification commensurate with the above teachings, and the skill or knowledge of the art, are within the scope of the present invention. The embodiments described hereinabove are further intended to explain best modes known of practicing the invention and to enable others skilled in the art to utilize the invention in such, or other, embodiments and with the various modifications required by the particular applications or uses of the invention. It is intended that the appended claims be construed to include alternative embodiments to the extent permitted by the prior art.

What is claimed is:

1. A cycle saddle having a central, longitudinal axis, comprising:
 a support structure;
 a pivotable member having first and second side portions, said first and second side portions being positioned on opposite sides of the axis and interfaceable with at least a portion of a rider's buttocks when positioned on said saddle; and
 means for interconnecting said pivotable member with said support structure to allow pivoting of said pivotable member substantially about the axis and relative to said support structure to account for and based upon the motion of the rider's ischial tuberosities when pedalling, whereby said first side portion generally moves upwardly when said second side portion generally moves downwardly and said second side portion generally moves upwardly when said first side portion generally moves downwardly due to an alternating communication of a force to said first and second side portions by the motion of the rider's ischial tuberosities which causes said pivoting of said pivotable member.

2. A saddle, as claimed in claim 1, wherein said support structure comprises a nose portion connected to a forward end portion of said pivotable member.

3. A saddle, as claimed in claim 2, wherein said support structure further comprises an aft portion, connected to an aft end portion of said pivotable member, and rail means for interconnecting said nose and aft portions and for attaching said saddle to a cycle.

4. A saddle, as claimed in claim 1, wherein said support structure comprises an aft portion connected to an aft end portion of said pivotable member.

5. A saddle, as claimed in claim 1, wherein said pivotable member comprises a primary beam positioned substantially along the axis when said saddle is in a static state.

6. A saddle, as claimed in claim 5, wherein said pivotable member further comprises first, second, third, and fourth secondary beams interconnected with said primary beam, said first and second secondary beams extending away from the axis on a first side of said primary beam, being displaced along said primary beam, and coinciding with said first side portion, said third and fourth secondary beams extending away from the axis on a second side of said primary beam, being displaced along said primary beam, and coinciding with said second side portion.

7. A saddle, as claimed in claim 6, wherein said primary beam and said first, second, third, and fourth secondary beams comprise a unitary, integrally formed beam assembly.

8. A saddle, as claimed in claim 1, wherein said first and second side portions of said pivotable member are each detachably connected to an underlying portion of said pivotable member, whereby each of said first and second side portions may be removed from said corresponding underlying portion, repositioned along said corresponding underlying portion and relative to the axis, and reattached to said corresponding underlying portion to adjust a position of each of said first and second side portions relative to the axis.

9. A saddle, as claimed in claim 1, further comprising padding means positioned on said first and second side portions for cushioning body portions contacting said first and second side portions.

10. A saddle, as claimed in claim 1, wherein said pivotable member comprises first and second end portions and wherein at least a portion of said pivotable member along the axis between said first and second end portions curves downwardly.

11. A saddle, as claimed in claim 1, wherein said pivotable member comprises first and second end portions and wherein a vertical positioning of said first end or second end portions is adjustable relative to said support structure.

12. A saddle, as claimed in claim 1, further comprising means for providing resistance to said pivoting of said pivotable member substantially about the axis and relative to said support structure.

13. A saddle, as claimed in claim 12, wherein said means for providing resistance is adjustable.

14. A cycle saddle having a central, longitudinal axis, comprising:
a support structure;
first means for engaging a first buttocks portion when a rider is positioned on said saddle, wherein said first means is connected to said support structure and wherein said first means has first and second side portions, said first and second side portions being positioned on opposite sides of the axis;
second means for engaging a second buttocks portion when the rider is positioned on said saddle, wherein said second means is connected to said support structure; and
means for adjusting a positioning of each of said first and second side portions of said first means relative to both the axis and at least a portion of said support structure independently of a positioning of said second means and without adjusting said positioning of said second means.

15. A saddle, as claimed in claim 14, further comprising third means for providing stability to the rider when positioned on said saddle, wherein said third means is connected to said support structure and is positioned forward of said first means.

16. A saddle, as claimed in claim 14, wherein said support structure comprises a beam means for longitudinally supporting said first means.

17. A saddle, as claimed in claim 14, wherein said support structure comprises a beam means for laterally supporting said first means.

18. A saddle, as claimed in claim 14, wherein said positioning of said first side portion relative to the axis and said at least a portion of said support structure is adjustable independently of said positioning of said second side portion relative to the axis and said at least a portion of said support structure.

19. A saddle, as claimed in claim 14, wherein said first and second side portions each extend generally downwardly and outwardly from the axis.

20. A saddle, as claimed in claim 14, wherein said first means has first and second ends and wherein said first and second ends are connected to said support structure about the axis.

21. A saddle, as claimed in claim 20, wherein a vertical positioning of said first end relative to said second end is adjustable.

22. A saddle, as claimed in claim 14, wherein said first means is pivotable substantially about the axis, whereby said first side portion moves generally upwardly as said second side portion moves generally downwardly and said second side portion moves generally upwardly as said first side portion moves generally downwardly.

23. A saddle, as claimed in claim 14, wherein said first and second side portions are detachably connected to said support structure and may be removed from said support structure independently of said second means and without any change in positioning of said second means.

24. A saddle, as claimed in claim 14, wherein said second means comprises third and fourth side portions, said third and fourth side portions being positioned on opposite sides of the axis.

25. A saddle, as claimed in claim 24, wherein said third and fourth side portions each extend generally downwardly and outwardly from the axis.

26. A saddle, as claimed in claim 24, wherein said third and fourth side portions are supported at a third and fourth distance, respectively, from the axis by rail means.

27. A saddle, as claimed in claim 26, wherein said third and fourth distances are adjustable.

28. A cycle saddle having a central, longitudinal axis, comprising:
a support structure;
a pivotable member having first and second end portions and first and second side portions, said first and second end portions being connected to said support structure substantially about the axis, said first and second side portions being positioned on opposite sides of the axis and interfaceable with a rider's buttocks when positioned on said saddle, wherein said first and second side portions extend generally downwardly and outwardly from the axis at a predetermined angle.

29. A modular cycle saddle having a central, longitudinal axis, comprising:
a forward portion defining at least a portion of a profile of said saddle;
an aft portion having first and second side portions and defining at least a portion of said profile, said first and second side portions being positioned on opposite sides of the axis;
rail means for interconnecting said forward and aft portions and for attaching said saddle to a cycle;
a beam assembly extending between and connected to said forward and aft portions, wherein at least a portion of said beam assembly is positioned substantially along the axis when said saddle is in a static state and at least portions of said beam assembly are positioned on opposite sides of the axis; and
first and second engaging members detachably connectable to said beam assembly on opposite sides of the axis and defining at least a portion of said profile of said saddle, wherein said first and second engaging members are removable from said beam assembly independently of said forward and aft portions.

30. A saddle, as claimed in claim 29, wherein said forward and aft portions are each detachably connected to said rail means and said beam assembly, and wherein said forward and aft portions are each independently replaceable.

31. A saddle, as claimed in claim 29, wherein said aft portion is detachably connected to each of said rail means and said beam assembly, and wherein said first and second side portions of said aft portion are each independently replaceable.

32. A saddle, as claimed in claim 29, wherein said beam assembly comprises a primary beam and first, second, third, and fourth secondary beams, said primary beam substantially coinciding with the axis when said saddle is in static state, said first and second secondary beams extending outwardly from a first side of said primary beam and displaced therealong, said third and fourth secondary beams extending outward from a second side of said primary beam and displaced therealong, whereby said first engaging member is positionable on and supported by said first and second secondary beams and said secondary engaging member is positionable on and supported by said third and fourth secondary beams.

33. A saddle, as claimed in claim 32, wherein said primary beam and said first, second, third, and fourth secondary beams are a unitary structure and integrally formed.

34. A saddle, as claimed in claim 29, wherein at least a portion of said beam assembly is torsionally deflectable to allow pivoting of said first and second engaging members substantially about the axis.

* * * * *